(12) United States Patent
Nesbitt

(10) Patent No.: US 6,394,915 B1
(45) Date of Patent: May 28, 2002

(54) GOLF BALL CORES FORMED FROM BLENDS OF NEODYMIUM AND COBALT SYNTHESIZED HIGH MOLECULAR WEIGHT BUTADIENE RUBBER

(75) Inventor: R. Dennis Nesbitt, Westfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/226,727

(22) Filed: Jan. 7, 1999

Related U.S. Application Data

(63) Continuation-in-part of application No. 08/819,945, filed on Mar. 18, 1997, now Pat. No. 5,895,105, which is a continuation of application No. 08/370,224, filed on Jan. 9, 1995, now abandoned, which is a continuation of application No. 07/893,277, filed on Jun. 4, 1992, now abandoned, which is a continuation-in-part of application No. 07/874,066, filed on Apr. 24, 1992, now abandoned.

(51) Int. Cl.$^7$ .......................... A63B 37/12; A63B 37/14
(52) U.S. Cl. .................. 473/378; 473/373; 473/372; 473/377; 473/385
(58) Field of Search .............................. 473/373, 385, 473/377, 378, 372

(56) References Cited

U.S. PATENT DOCUMENTS

| | | |
|---|---|---|
| 3,421,766 A | 1/1969 | Chmiel et al. |
| 3,432,165 A | 3/1969 | Haines et al. |
| 3,478,132 A | 11/1969 | Randolph |
| 3,572,721 A | 3/1971 | Harrison et al. |
| 3,883,145 A | 5/1975 | Cox et al. |
| 4,048,427 A * | 9/1977 | Hargis .................. 526/337 |
| 4,076,255 A | 2/1978 | Moore |
| 4,082,288 A | 4/1978 | Martin et al. |
| 4,264,075 A | 4/1981 | Miller et al. |
| 4,266,772 A | 5/1981 | Martin et al. |
| 4,328,133 A | 5/1982 | Ogawa et al. |
| 4,398,000 A * | 8/1983 | Kataoka .................. 525/437 |
| 4,683,257 A | 7/1987 | Kakiuchi et al. |
| 4,696,475 A | 9/1987 | Tomita et al. |
| 4,726,590 A | 2/1988 | Molitor |
| 4,838,556 A | 6/1989 | Sullivan |
| 4,844,471 A | 7/1989 | Terence et al. |
| 4,852,884 A | 8/1989 | Sullivan |
| 4,929,678 A | 5/1990 | Hamada et al. |
| 4,931,376 A | 6/1990 | Hattori et al. |
| 4,955,613 A | 9/1990 | Gendreau et al. |
| 4,974,852 A | 12/1990 | Hiraoka et al. |
| 4,984,803 A | 1/1991 | Llort et al. |
| 4,986,545 A | 1/1991 | Sullivan |
| 5,082,285 A | 1/1992 | Hamada et al. |
| 5,098,105 A | 3/1992 | Sullivan |
| 5,120,791 A | 6/1992 | Sullivan |
| 5,131,662 A | 7/1992 | Pollitt |
| 5,187,013 A | 2/1993 | Sullivan |
| 5,209,485 A | 5/1993 | Nesbitt et al. |

(List continued on next page.)

FOREIGN PATENT DOCUMENTS

| | | |
|---|---|---|
| CA | 674595 | 11/1963 |
| CA | 713631 | 7/1965 |
| GB | 963380 | 6/1978 |
| JP | 91059931 | 9/1991 |

*Primary Examiner*—Peter Vo
*Assistant Examiner*—Paul Kim

(57) ABSTRACT

The present invention is directed to improved polybutadiene compositions suitable for use in molded golf ball core construction. The improved polybutadiene compositions are composed of at least two certain types of polybutadiene, which has the effect of increasing the resiliency of the resulting molded cores and greatly facilitates processing of the compositions and forming the cores. Also disclosed are improved golf ball cores, and balls utilizing such cores, formed from particular ultra high Mooney viscosity polybutadiene.

21 Claims, 2 Drawing Sheets

U.S. PATENT DOCUMENTS

| | | |
|---|---|---|
| 5,215,308 A | 6/1993 | Nesbitt |
| 5,306,760 A | 4/1994 | Sullivan |
| 5,312,857 A | 5/1994 | Sullivan |
| 5,324,783 A | 6/1994 | Sullivan |
| 5,328,959 A | 7/1994 | Sullivan |
| 5,330,837 A | 7/1994 | Sullivan |
| 5,338,610 A | 8/1994 | Sullivan |
| 5,504,156 A * | 4/1996 | Takezaki .................... 525/93 |
| 5,508,350 A * | 4/1996 | Cardorniga ................ 525/193 |
| RE35,293 E | 7/1996 | Hiraoka et al. |
| 5,542,677 A | 8/1996 | Sullivan et al. |
| 5,580,057 A | 12/1996 | Sullivan et al. |
| 5,585,440 A | 12/1996 | Yamada et al. |
| 5,591,803 A | 1/1997 | Sullivan et al. |
| 5,733,206 A | 3/1998 | Nesbitt et al. |
| 5,777,013 A * | 7/1998 | Gardiner .................... 524/274 |
| 5,833,553 A * | 11/1998 | Sullivan .................... 473/374 |
| 5,895,105 A * | 4/1999 | Nesbitt ...................... 525/193 |
| 6,015,356 A * | 1/2000 | Sullivan .................... 473/373 |

\* cited by examiner

US 6,394,915 B1

GOLF BALL CORES FORMED FROM BLENDS OF NEODYMIUM AND COBALT SYNTHESIZED HIGH MOLECULAR WEIGHT BUTADIENE RUBBER

CROSS REFERENCE TO RELATED APPLICATIONS

This is a continuation-in-part of U.S. application Ser. No. 08/819,945 filed Mar. 18, 1997 now U.S. Pat. No. 5,895,105; which is a continuation of U.S. application Ser. No. 08/370,224 filed Jan. 9, 1995 now abandoned; which is a continuation of U.S. application Ser. No. 07/893,277 filed Jun. 4, 1992 now abandoned; and which is a continuation-in-part of U.S. application Ser. No. 07/874,066 filed on Apr. 24, 1992 now abandoned.

FIELD OF THE INVENTION

The present invention is directed to improved polybutadiene compositions for use in molded golf ball cores. The improved polybutadiene compositions utilize a blend of two particular butadiene rubbers synthesized through the use of neodymium and cobalt-containing catalysts. Each of the polybutadiene blends contains an ultra-high Mooney viscosity polybutadiene. The use of such a blend of butadiene rubbers increases the resiliency of the ball. In addition, significantly improved mixing properties are achieved. The present invention is also directed to golf balls and cores produced by utilizing the improved polybutadiene compositions.

BACKGROUND OF THE INVENTION

Two of the principal properties involved in the performance of golf balls are resilience and hardness. Resilience is determined by the coefficient of restitution (referred to as "C.O.R."), also expressed as the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter. The lower the compression value, the harder the material.

Resilience (C.O.R.), along with additional factors such as clubhead speed, angle of trajectory, and ball configuration (i.e. dimple pattern), generally determine the distance a ball will travel when hit. Since clubhead speed and the angle of trajectory are not factors easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and electronically measuring the ball's incoming and outgoing velocity. The coefficient of restitution must be carefully controlled in all commercial golf balls in order for the ball to be within the specifications regulated by the United States Golfers Association ("U.S.G.A."). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

Polybutadiene has been utilized in forming golf ball cores. Prior artisans have investigated utilizing various grades of polybutadiene in core compositions. For example, such attempts are described in U.S. Pat. Nos. 5,385,440; 4,931,376; 4,683,257; 4,955,613; and 4,984,803; and in Japanese Patent References JP 58225138 and JP 7268132, all of which are hereby incorporated by reference. Although some of the core compositions described in these disclosures are satisfactory, a need remains for an improved composition for forming golf ball cores.

Accordingly, it is an object of the present invention to provide an improved core composition which, when utilized to formulate golf ball cores, produces golf balls exhibiting enhanced C.O.R. and improved processing.

These and other objects and features of the invention will be apparent from the following summary and description of the invention and from the claims.

SUMMARY OF THE INVENTION

The present invention achieves all of the foregoing objectives and provides, in a first aspect, a golf ball comprising a core formed from a composition including two particular types of polybutadiene, and a cover disposed about the core. The first polybutadiene utilized in the core is polymerized in the presence of a cobalt or a cobalt-based catalyst and, prior to curing, has a Mooney viscosity from about 65 to about 85. The second polybutadiene is polymerized in the presence of a neodymium or neodymium-based catalyst. In some applications, a nickel-based catalyst may be utilized instead of or in addition to the cobalt catalyst in forming the first polybutadiene. And, the second polybutadiene may be polymerized in the presence of a lanthanide series catalyst instead of or in addition to the neodymium catalyst. The golf ball also includes one or more cover layers generally surrounding the core.

In yet another aspect, the present invention provides a golf ball comprising a core formed from a composition including from about 80 parts to about 120 parts by weight of certain elastomer components, and at least about 60 parts by weight of non-elastomer components. The golf ball further includes a polymeric cover disposed about the core. The elastomer components include a first polybutadiene, synthesized in the presence of a cobalt or nickel catalyst, which prior to curing, exhibits a Mooney viscosity of from about 65 to about 85. The elastomer components also include a second polybutadiene that is synthesized in the presence of a neodymium or lanthanide series catalyst.

In yet another aspect, the present invention provides a golf ball comprising a core formed from a composition that includes two particular types of polybutadiene, and a polymeric cover that is disposed about the core. The core composition includes a first polybutadiene which prior to curing, has a polydispersity of from about 1.9 to about 3.9 and has a Mooney viscosity of from about 65 to about 85. The first polybutadiene is synthesized in the presence of a cobalt or nickel catalyst. The core composition further includes a second polybutadiene synthesized in the presence of neodymium or a lanthanide catalyst.

The present invention also provides, in yet another aspect, a composition that is adapted for forming a golf ball core. The composition comprises a first polybutadiene having a Mooney viscosity of from about 65 to about 85, in which the first polybutadiene is synthesized in the presence of a cobalt or nickel-based catalyst. The composition further comprises a second polybutadiene having a Mooney viscosity of from about 30 to about 65 and which is synthesized in the presence of a neodymium or lanthanide series catalyst. The composition further comprises at least one crosslinking agent.

Furthermore, the present invention provides a method for producing a golf ball which comprises combining two particular types of polybutadiene to form a core composition, molding the core composition to form a golf ball core, and subsequently forming a cover about the golf ball core to produce the golf ball. The golf ball core is formed from a first polybutadiene having a Mooney viscosity of from about 65 to about 85 and a polydispersity of from about 1.9 to about 3.9. The second polybutadiene is synthesized in the presence of a neodymium or lanthanide series catalyst.

Further scope of the applicability of the invention will become apparent from the detailed description provided below.

DETAILED DESCRIPTION OF THE PREFERRED EMBODIMENTS

Figure 1:
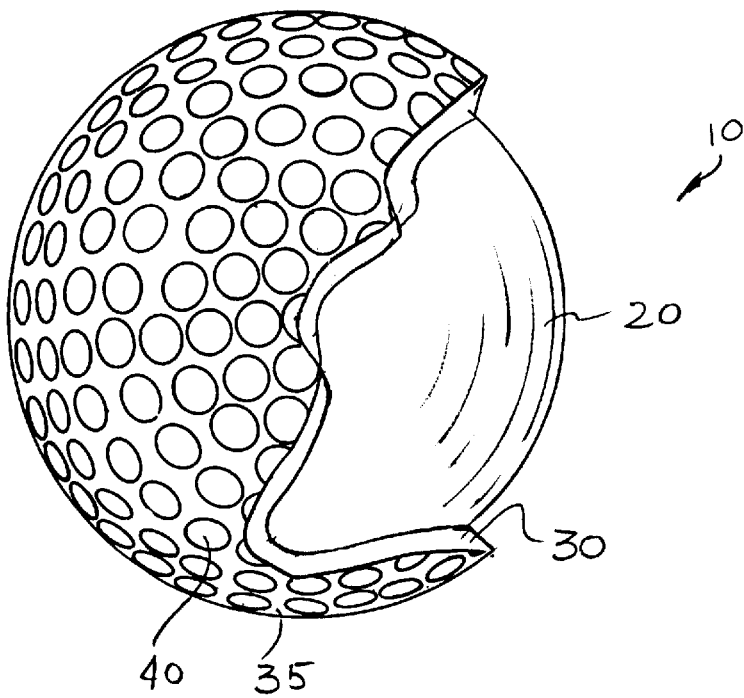
FIG. 1 is a partial sectional view of a first preferred embodiment golf ball in accordance with the present invention.

The present invention is directed to improved compositions which, when utilized in formulating golf ball cores, produce cores that exhibit a relatively high degree of resilience. The invention is also directed to improving the processability of polybutadiene, particularly in forming golf ball cores. In these regards, it has been found that the use of a blend of particular polybutadiene resins in a golf ball core composition has the effect of increasing the resiliency of the resultant cores and greatly facilitates core formation.

The compositions of the present invention comprise one or more rubber or elastomeric components and an array of non-rubber or non-elastomeric components. The rubber components of the core compositions of the invention comprise a particular polybutadiene synthesized with cobalt and having an ultra-high Mooney viscosity and certain molecular weight characteristics described in detail below, another particular polybutadiene synthesized with neodymium, and one or more other optional polybutadienes. In some applications, polybutadienes synthesized with nickel catalysts may be used in combination with or instead of polybutadienes synthesized with cobalt catalysts. And, polybutadienes synthesized with lanthanide series catalysts may be used in combination with or instead of polybutadienes synthesized with neodymium catalysts. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

The first preferred polybutadiene resin for use in the present invention composition has a relatively ultra high Mooney viscosity. A "Mooney unit" is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$(100° C.], defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook,* 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\sum W_i}{\sum W_i / M_i}$$

where $W_i$ is the molecular weight of a fraction or sample of the polymer and $M_i$ is the total number of fractions or samples.

"Weight average molecular weight," $M_w$ is defined as:

$$M_w = \frac{\sum W_i M_i}{\sum W_i}$$

where $W_i$ and $M_i$ have the same meanings as noted above.

The "Z-average molecular weight," $M_z$, is defined as:

$$M_z = \frac{\sum W_i M_i^2}{\sum W_i M_i}$$

where $W_i$ and $M_i$ have the same meanings as noted above.

"$M_{peaks}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity", P:

$$P = \frac{M_w}{M_n}$$

Polydispersity, also referred to as "dispersity", also provides an indication of the extent to which the polymer chains share the same degree of polymerization. If the polydispersity is 1.0, then all polymer chains must have the same degree of polymerization. Since weight average molecular weight is always equal to or greater than the number average molecular weight, polydispersity, by definition, is equal to or greater than 1.0:

$$P \geq 1.0$$

The first particular polybutadiene for use in the preferred embodiment compositions of the present invention exhibits a Mooney viscosity of from about 65 to about 85, and preferably from about 70 to about 83. The first particular polybutadiene has a number average molecular weight $M_n$ of from about 90,000 to about 130,000; and preferably from about 100,000 to about 120,000. The first particular polybutadiene has a weight average molecular weight $M_w$ of from about 250,000 to about 350,000; and preferably from about 290,000 to about 310,000. The first particular polybutadiene has a Z-average molecular weight $M_z$ of about 600,000 to about 750,000; and preferably from about 660,000 to about 700,000. The first particular polybutadiene has a peak molecular weight $M_{peak}$ of about 150,000 to about 200,000; and preferably from about 170,000 to about 180,000.

The polydispersity of the first particular polybutadiene for use in the preferred embodiment compositions typically ranges from about 1.9 to about 3.9; and preferably from about 2.4 to about 3.1. Most preferably, the polydispersity is about 2.7.

The first particular polybutadiene for use in the preferred embodiment compositions preferably contains a majority fraction of polymer chains containing a cis-1, 4 bond, more preferably, having a cis-1, 4 polybutadiene content of about 90%, and most preferably, having a cis-1,4 polybutadiene content of at least about 95%. Another characteristic of the first preferred polybutadiene is that it is obtained or synthesized by utilizing a cobalt or cobalt-based catalyst. As noted herein, in some applications, a polybutadiene synthesized by using a nickel catalyst may be employed with, or in place of, the polybutadiene synthesized with a cobalt catalyst.

A commercially available polybutadiene corresponding to the noted first preferred ultra high viscosity polybutadiene, and which is suitable for use in the preferred embodiment compositions in accordance with the present invention is available under the designation Cariflex BCP 820, from Shell Chimie of France. Although this polybutadiene produces cores exhibiting higher C.O.R. values, it is somewhat difficult to process using conventional equipment. The properties and characteristics of this preferred polybutadiene are set forth below in Table 1.

TABLE 1

Properties of Shell Chimie BCP 820 (Also Known As BR-1202J)

| Property | Value |
| --- | --- |
| Mooney Viscosity (approximate) | 70–83 |
| Volatiles Content | 0.5% maximum |

TABLE 1-continued

Properties of Shell Chimie BCP 820 (Also Known As BR-1202J)

| | |
| --- | --- |
| Ash Content | 0.1% maximum |
| Cis 1,4-polybutadiene Content | 95.0% minimum |
| Stabilizer Content | 0.2 to 0.3% |
| Polydispersity | 2.4–3.1 |

| Molecular Weight Data: | Trial 1 | Trial 2 |
| --- | --- | --- |
| $M_n$ | 110,000 | 111,000 |
| $M_w$ | 300,000 | 304,000 |
| $M_z$ | 680,000 | |
| $M_{peak}$ | 175,000 | |

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high dry swell characteristics.

Examples of such second polybutadienes obtained by using a neodymium-based catalyst include NEOCIS 40, NEOCIS 60 from Enichem and CB-22, CB-23, and CB-24 from Bayer. The properties of these polybutadienes are given below.

TABLE 2

Properties of NEOCIS

| Properties of Raw Polymer | |
| --- | --- |
| Microstructure | |
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) | |
| Vulcanization at 145° C. | |
| Tensile strength, 35' cure, | 16 MPa |
| Elongation, 35' cure, | 440% |
| 300% modulus, 35' cure, | 9.5 MPa |

TABLE 3A

Properties of CB-22

| TESTS | RESULTS | SPECIFICATIONS |
| --- | --- | --- |
| 1. Mooney-Viscosity ML1 + 4 100 Cel/ASTM-sheet | | |
| ML1 + 1 Minimum | 58 | MIN.58 ME |
| Maximum | 63 | MAX.68 ME |
| Median | 60 | 58–68 ME |
| 2. Content of ash DIN 53568 | | |
| Ash | 0.1 | MAX.0.5% |
| 3. Volatile matter heating 3h/105 Cel | | |
| Loss in weight | 0.11 | MAX.0.5% |
| 4. Organic acid Bayer Nr.18 | | |
| Acid | 0.33 | MAX.1.0% |

TABLE 3A-continued

Properties of CB-22

| TESTS | | RESULTS | SPECIFICATIONS |
|---|---|---|---|
| 5. | CIS-1,4 content | | |
| | IR-spectroscopy | | |
| | CIS 1,4 | 97.62 | MIN.96.0% |
| 6. | Vulcanization behaviour | | |
| | Monsanto MDR/160 Cel | | |
| | DIN 53529 | | |
| | Compound after | | |
| | ts01 | 3.2 | 2.5–4.1 min |
| | t50 | 8.3 | 6.4–9.6 min |
| | t90 | 13.2 | 9.2–14.0 min |
| | s'min | 4.2 | 3.4–4.4 dN.m |
| | s'max | 21.5 | 17.5–21.5 dN.m |
| 7. | Informative data | | |
| | Vulcanization 150 Cel 30 min | | |
| | Tesile | ca. 15,0 | |
| | Elongation at break | ca. 450 | |
| | Stress at 300% elongation | ca. 9,5 | |

TABLE 3B

Properties of CB-23

| TESTS | | RESULTS | SPECIFICATIONS |
|---|---|---|---|
| 1. | Mooney-Viscosity | | |
| | ML1 + 4 100 Cel/ASTM-sheet | | |
| | ML1 + 4 Minimum | 50 | MIN.46 ME |
| | Maximum | 54 | MAX.56 ME |
| | Median | 51 | 46–56 ME |
| 2. | Content of ash | | |
| | DIN 53568 | | |
| | Ash | 0.09 | MAX.0.5% |
| 3. | Volatile matter | | |
| | DIN 53526 | | |
| | Loss in weight | 0.19 | MAX.0.5% |
| 4. | Organic acid | | |
| | Bayer Nr.18 | | |
| | Acid | 0.33 | MAX.1.0% |
| 5. | CIS-1,4 content | | |
| | IR-spectroscopy | | |
| | CIS 1,4 | 97.09 | MIN.96.0% |
| 6. | Vulcanization behaviour | | |
| | Monsanto MDR/160 Cel | | |
| | DIN 53529 | | |
| | Compound after | MIN.96.0 | |
| | ts01 | 3.4 | 2.4–4.0 min |
| | t50 | 8.7 | 5.5–9.0 min |
| | t90 | 13.5 | 8.7–13.5 min |
| | s'min | 3.1 | 2.7–3.8 dN.m |
| | s'max | 20.9 | 17.7–21.7 dN.m |
| 7. | Vulcanization test | | |
| | with ring | | |
| | Informative data | | |
| | Tesile | ca 15,5 | |
| | Elongation at break | ca. 470 | |
| | Stress at 300% elongation | ca. 9,3 | |

TABLE 3C

Properties of CB-24

| TESTS | | RESULTS | SPECIFICATIONS |
|---|---|---|---|
| 1. | Mooney-Viscosity | | |
| | ML1 + 4 100 Cel/ASTM-sheet | | |
| | ML1 + 4 Minimum | 44 | MIN.39 ME |
| | Maximum | 46 | MAX.49 ME |
| | Median | 45 | 39–49 ME |

TABLE 3C-continued

Properties of CB-24

| TESTS | | RESULTS | SPECIFICATIONS |
|---|---|---|---|
| 2. | Content of ash | | |
| | DIN 53568 | | |
| | Ash | 0.12 | MAX.0.5% |
| 3. | Volatile matter | | |
| | DIN 53526 | | |
| | Loss in weight | 0.1 | MAX.0.5% |
| 4. | Organic acid | | |
| | Bayer Nr.18 | | |
| | Acid | 0.29 | MAX.1.0% |
| 5. | CIS-1,4 content | | |
| | IR-spectroscopy | | |
| | CIS 1,4 | 96.73 | MIN.96.0% |
| 6. | Vulcanization behaviour | | |
| | Monsanto MDR/160 Cel | | |
| | DIN 53529 | | |
| | Compound after | | |
| | masticator | | |
| | ts01 | 3.4 | 2.6–4.2 min |
| | t50 | 8.0 | 6,2–9,4 min |
| | t90 | 12.5 | 9,6–14,4 min |
| | s'min | 2.8 | 2.0–3.0 dN.m |
| | s'max | 19.2 | 16.3–20.3 dN.m |
| 7. | Informative data | | |
| | Vulcanization 150 Cel 30 min | | |
| | Tesile | ca 15,0 | |
| | Elongation at break | ca. 470 | |
| | Stress at 300% elongation | ca. 9,1 | |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

The compositions of the present invention may also utilize other polybutadiene resins in addition to the noted first and second particular polybutadienes. For example, Cariflex BR-1220 polybutadiene available from Shell Chemical (see Table 4 below); may be utilized as another polybutadiene in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 4

Properties of Cariflex BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML1 + 4 @ 212° F.)
90% Cure - 10.0–13.0
Polydispersity 2.5–3.5

| Molecular Weight Data: | Trial 1 | Trial 2 |
|---|---|---|
| $M_n$ | 80,000 | 73,000 |
| $M_w$ | 220,000 | 220,000 |

TABLE 4-continued

Properties of Cariflex BR-1220 Polybutadiene

| $M_z$ | 550,000 |
|---|---|
| $M_{peak}$ | 110,000 |

Concerning the elastomeric or rubber portion of the preferred embodiment compositions, it is preferred to utilize the previously described first and second polybutadienes in particular proportions to one another. Generally, it is preferred to utilize the first polybutadiene in a proportion of less than 50 parts per hundred parts of the total amount of the first and second polybutadienes. Unless indicated otherwise, all parts expressed herein are parts by weight. More preferably, the first polybutadiene is utilized in a proportion of about 45 parts or less (most preferably 40 parts or less) per hundred parts of the total amount of the first and second polybutadienes. With respect to the second polybutadiene, it is generally preferred to utilize the second polybutadiene in a proportion of more than 50 parts per hundred parts of the total amount of the first and second polybutadienes. More preferably, the second polybutadiene is utilized in a proportion of about 55 parts or more (most preferably 60 parts or more) per hundred parts of the total amount of the first and second polybutadienes.

The preferred embodiment core compositions of the present invention generally comprise from about 80 parts to about 120 parts by weight of elastomeric or rubber components, i.e. the first and second polybutadienes, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described first and second polybutadienes. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate, is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy) valerate, 1,1-bis (t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl4,4-bis(t-butylperoxy) valerate and Luperco 231 XL and Trigonox 29/40 are 1,1-di(t-butylperoxy) 3,3,5-trimethyl cyclohexane.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

Moreover, filler-reinforcement agents may be added to the composition of the present invention. One such example is polypropylene powder. Since the specific gravity of polypropylene powder is very low, and when compounded, the polypropylene powder produces a lighter molded core, large amounts of higher gravity fillers may be added. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy filler include metal particles, such as powdered tungsten, bismuth, or molybdenum.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

The golf ball core compositions of the invention may also comprise from about 1 to about 100 parts by weight of particulate polypropylene resin, and preferably from about 10 to about 100 parts by weight polypropylene powder resin, per 100 parts by weight of a base elastomer (or rubber) selected from polybutadiene and mixtures of polybutadiene with other elastomers. More preferably, the particulate polypropylene resin, if utilized in the core compositions of the present invention, comprises from about 20 to about 40 parts by weight of a polypropylene powder resin such as that trademarked and sold by Amoco Chemical Co. under the designation "6400 P", "7000P" and "7200 P". The ratios of the ingredients may vary and are best optimized empirically.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

It will be understood that the present invention golf balls may further include one or more interior or mantle layers. Such layers are usually disposed between the core and the cover components of the ball. It is also contemplated by the present inventor that the preferred blend of first and second polybutadienes described herein could be utilized in one or more of these interior mantle layers.

Figure 2:
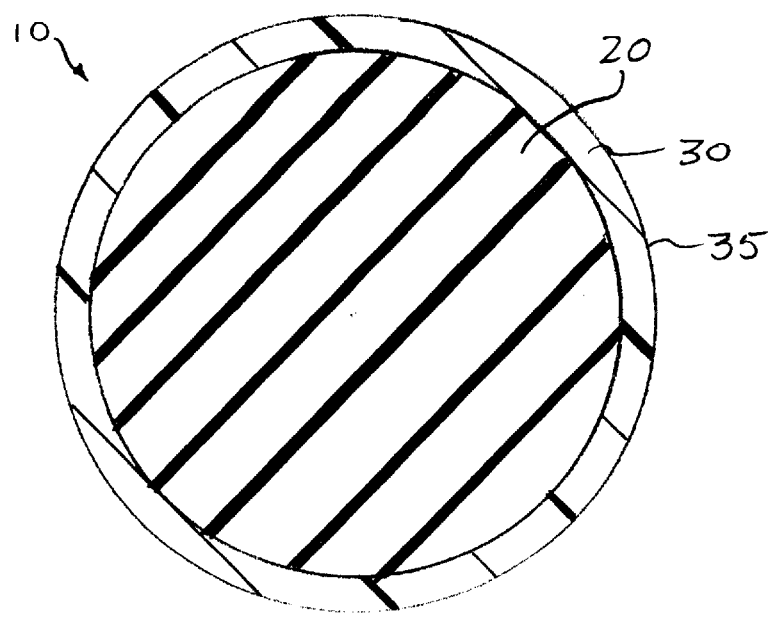
FIG. 2 is a cross sectional view of the first preferred embodiment golf ball.

The present invention is well suited for forming cores for golf balls as described herein. Referring to FIGS. 1 and 2, a first preferred embodiment golf ball 10 is illustrated. It will be understood that all figures are schematics and not necessarily to scale. The first preferred embodiment golf ball 10 comprises a core 20, most preferably as described herein, and a cover layer 30 disposed about the core 20. The core 30 includes an outer surface 35 that defines a plurality of dimples 40 along the outer surface 35 as is known in the art.

Figure 3:
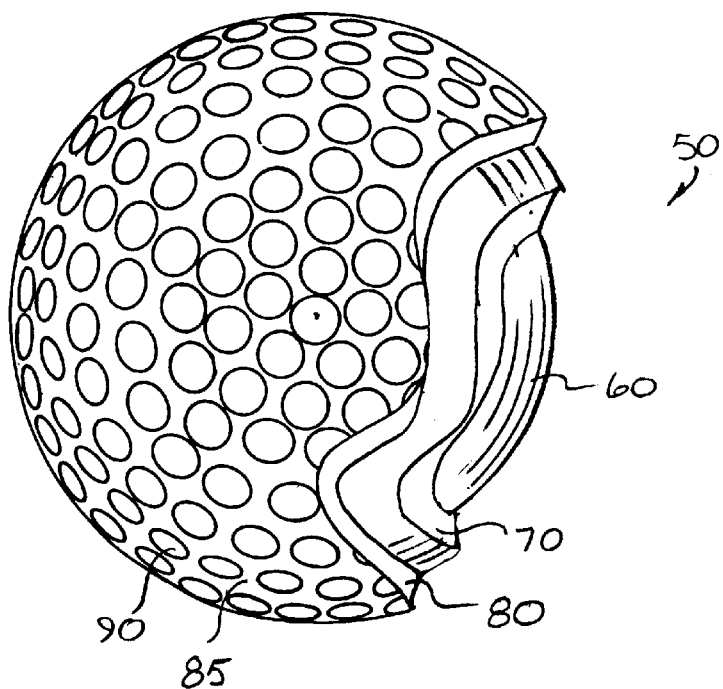
FIG. 3 is a partial sectional view of a second preferred embodiment golf ball in accordance with the present invention.
Figure 4:
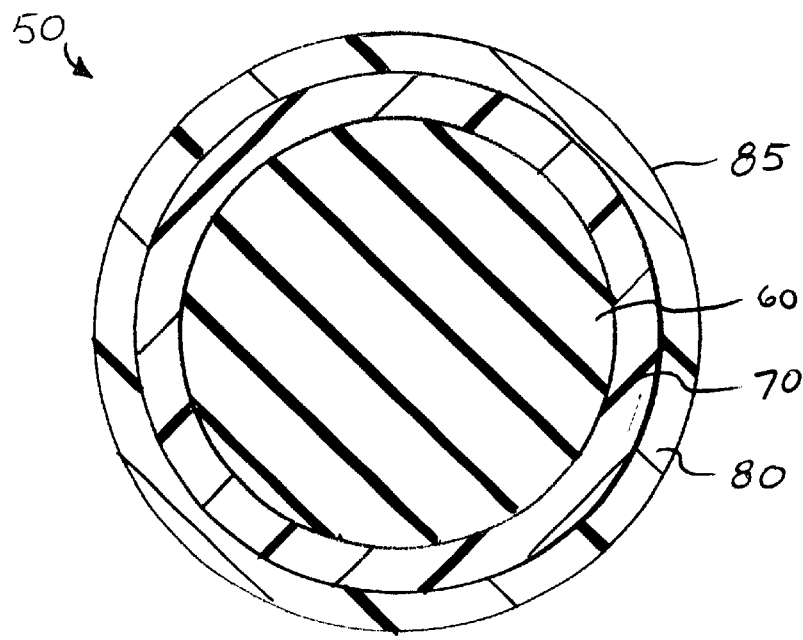
FIG. 4 is a cross sectional view of the second preferred embodiment golf ball.

The present invention core compositions are also well suited for use in multi-layer golf balls such as for example, a second preferred golf ball 50 illustrated in FIGS. 3 and 4. The second preferred embodiment golf ball 50 comprises a core 60, a first inner layer 70 disposed about the core 60, and an outer cover layer 80 disposed about the inner layer 70. The inner layer 70 may include one or more interior layers or mantles. The outer cover layer 80 may include one or more cover layers. The outer layer 80 includes an outer surface 85 that defines a plurality of dimples 90 as known in the art.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, powder resin, fillers, zinc salt, metal oxide, fatty acid, and any other optional components, if desired, are blended for about 7 minutes in an internal mixer such as a Banbury mixer. As a result of shear during mixing, the temperature rises to about 200° F., whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.050 to about 0.250 inch and preferably from about 0.060 to about 0.090 inch.

The composition of the cover may vary depending upon the desired properties for the resulting golf ball. A wide array of cover formulations may be utilized such as those disclosed in U.S. Pat. Nos. 4,986,545; 5,098,105; 5,120,791; 5,187,013; 5,306,760; 5,312,857; 5,324,783; 5,328,959; 5,330,837; 5,338,610; 5,542,677; 5,580,057; 5,591,803; and 5,733,206, all of which are hereby incorporated by reference.

The covered golf ball can be formed in any one of several methods known in the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 200° F. to about 300° F.

The golf ball produced is then painted and marked, painting being effected by spraying techniques.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Using the ingredients tabled below, golf ball cores having a finished diameter of about 1.470 to about 1.475 inches were produced by compression molding and subsequent removal of a surface layer by grinding. Each core was formulated using 100 parts elastomer (rubber). In the formulations, the amounts of remaining ingredients are expressed in parts by weight, and the coefficient of restitution and compression achieved are set forth below. The properties of the molded cores produced from each formulation were measured according to the following parameters: compression of 47 corresponds to a deflection under load of 0.047 inches.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Tables 5 and 6 summarize the results of testing of four core compositions.

TABLE 5

Composition of Golf Ball Cores

| | | Trial | | |
|---|---|---|---|---|
| Component | Control 1 | 2 | 3 | 4 |
| Cariflex BR-1220[2] | 100 | — | — | — |
| Cariflex BCP-820[1] | — | 100 | 40 | 40 |
| Neo Cis 60[3] | — | — | 60 | — |
| CB-22[4] | — | — | — | 60 |
| Zinc Oxide (activator filler) | 30.9 | 31 | 30.7 | 30.2 |
| Zinc Stearate (activator) | 16 | 16 | 16 | 16 |

TABLE 5-continued

Composition of Golf Ball Cores

| | | Trial | | |
|---|---|---|---|---|
| Component | Control 1 | 2 | 3 | 4 |
| ZDA (zinc diacrylate) | 21.1 | 20.9 | 21.5 | 22.5 |
| 231 XL (peroxide) | 0.90 | 0.90 | 0.90 | 0.90 |
| | 168.9 | 168.8 | 169.1 | 169.6 |

[1]See Table 1 for a description and properties of Cariflex BCP-B20
[2]See Table 4 for a description and properties of Cariflex BR-1220
[3]See Table 2 for a description and properties of Neo Cis 60
[4]See Table 3A for a description and properties of Buna CB-22

TABLE 6

Properties of Golf Ball Cores

| | | Trial | | |
|---|---|---|---|---|
| Property | Control 1 | 2 | 3 | 4 |
| Size (pole dia. inches) | 1.474 | 1.474 | 1.473 | 1.475 |
| Weight (grams) | 33.3 | 33.3 | 33.2 | 33.3 |
| Riehle Compression | 0.112 | 0.109 | 0.112 | 0.113 |
| C.O.R. | 0.776 | 0.785 | 0.781 | 0.781 |
| Nes Factor[1] | .888 | .894(+6) | .893(+5) | .894(+6) |

[1]Nes Factor is the sum of the C.O.R. and the Riehle compression. The higher the number the higher the resilience. This adjusts the results for compression, i.e. Trial #2 has a compression of 0.109, this is 3 points harder than the control and is 9 points faster in C.O.R. than the control. This is a net gain of 6 points. Trial #3 has exactly the same compression as the control and needs no Nes Factor correction as both the C.O.R. and Nes Factor are 5 points higher.

The results of Table 6 show that the high Mooney BCP-820 is 9 points higher in C.O.R. vs. the control (low Mooney BR-1220). Blends of the high Mooney BCP-820 with Neodymium catalized Neo Cis 60 and CB-22 also show a 5 to 6 point gain in C.O.R.

The high Mooney BCP-820, while giving high C.O.R. values, is extremely difficult to process using conventional equipment. Blending the high Mooney BCP-820 with Neodymium catalized polybutadiene rubber solves the processing problems but maintains the high C.O.R. values.

Tables 7 and 8 summarize the results of additional testing.

TABLE 7

Composition of Golf Ball Cores

| | Trial | | | | | |
|---|---|---|---|---|---|---|
| Component | 1 | 2 | 3 | 4 | 5 | 6 |
| Cariflex BCP-B20 | 100 | — | — | 40 | 40 | 20 |
| Neo Cis 40 | — | 100 | — | 60 | — | — |
| Neo Cis 60 | — | — | 100 | — | 60 | 80 |
| Zinc Oxide | 31 | 31 | 31 | 31 | 31 | 31 |
| Zinc Stearate | 16 | 16 | 16 | 16 | 16 | 16 |
| ZDA | 20.9 | 20.9 | 20.9 | 20.9 | 20.9 | 20.9 |
| 231 XL | 0.90 | 0.90 | 0.90 | 0.90 | 0.90 | 0.90 |
| | 168.8 | 168.8 | 168.8 | 168.8 | 168.8 | 168.8 |

TABLE 8

Properties of Golf Ball Cores

| Property | Trial | | | | | |
|---|---|---|---|---|---|---|
| | 1 | 2 | 3 | 4 | 5 | 6 |
| Size (pole dia. inches) | 1.476 | 1.475 | 1.476 | 1.476 | 1.476 | 1.476 |
| Weight (grams) | 33.4 | 33.3 | 33.4 | 33.4 | 33.4 | 33.3 |
| Riehle Compression | 0.107 | 0.119 | 0.116 | 0.115 | 0.112 | 0.114 |
| C.O.R. | 0.785 | 0.773 | 0.777 | 0.776 | 0.780 | 0.778 |
| Nes Factor | .892 | .892 | .893 | .891 | .892 | .892 |

The results in Table 8 show there is very little difference in the 6 trials when the C.O.R. is corrected for differences in compression, i.e. Nes Factor. The Neodymium rubber when used at 100% or when blended with high Mooney BCP820 is equal to the properties of the high Mooney BCP-820 when used at 100%. Neodymium rubber when used at 100% is also extremely difficult to process due to high die swell during extrusion of preforms and high cold flow of the rubber causing deformed preforms resulting in very high rejects.

Neodymium polybutadiene and high Mooney polybutadiene rubber such as BCP-820 cannot be processed when used alone at 100 parts or conventional equipment such as two roll mills and extruders.

When the two rubbers above are blended together, processing of the synergistic mixture becomes easy and practical without losing any performance or C.O.R.

The invention has been described with reference to the preferred embodiments. Obviously, modifications and alterations will occur to others upon reading and understanding the preceding detailed description. It is intended that the invention be construed as including all such alternations and modifications insofar as they come within the scope of the claims and the equivalents thereof.

Having thus described the preferred embodiment, the invention is now claimed to be:

1. A golf ball comprising:
    a core formed from a composition including (i) 10 to 45 parts per hundred of a first polybutadiene, said first polybutadiene polymerized in the presence of a cobalt or nickel-based catalyst, and said first polybutadiene has a Mooney viscosity of from about 70 to about 83 and a polydispersity of from about 1.9 to about 3.9, and (ii) 55 to 90 parts per hundred of a second polybutadiene, said second polybutadiene polymerized in the presence of a neodymium or lanthanide series catalyst; and
    at least one or more cover layers disposed about said core.
2. The golf ball of claim 1 wherein said first polybutadiene has a polydispersity of from about 2.4 to about 3.1.
3. The golf ball of claim 2 wherein said first polybutadiene has a polydispersity of about 2.7.
4. The golf ball of claim 1 wherein said first polybutadiene has a number average molecular weight of from about 90,000 to about 130,000.
5. The golf ball of claim 4 wherein said first polybutadiene has a number average molecular weight of from about 100,00 to about 120,000.
6. The golf ball of claim 1 wherein said first polybutadiene has a weight average molecular weight of from about 250,000 to about 350,000.
7. The golf ball of claim 6 wherein said first polybutadiene has a weight average molecular weight of from about 290,000 to about 310,000.
8. The golf ball of claim 1 wherein said first polybutadiene has a Z-average molecular weight of from about 600,000 to about 750,000.
9. The golf ball of claim 8 wherein said first polybutadiene has a Z-average molecular weight of from about 660,000 to about 700,000.
10. The golf ball of claim 1 wherein said first polybutadiene has a peak molecular weight of from about 150,000 to about 200,000.
11. The golf ball of claim 10 wherein said first polybutadiene has a peak molecular weight of from about 170,000 to about 180,000.
12. The golf ball of claim 1 wherein said composition comprises said first polybutadiene in a proportion of about 45 parts or less per 100 parts of said first polybutadiene and of about 55 parts or more per 100 parts of said second polybutadiene.
13. The golf ball of claim 12 wherein said composition comprises said first polybutadiene in a proportion of about 40 parts or less per 100 parts of said first polybutadiene and said second polybutadiene.
14. The golf ball of claim 1 wherein said second polybutadiene exhibits a Mooney viscosity of from about 35 to about 70.
15. The golf ball of claim 14 wherein said second polybutadiene exhibits a Mooney viscosity of from about 45 to about 60.
16. The golf ball of claim 15 wherein said second polybutadiene exhibits a Mooney viscosity of about 45 to about 60.
17. The golf ball of claim 1 wherein said first polybutadiene is polymerized in the presence of a cobalt catalyst, and said second polybutadiene is polymerized in the presence of a neodymium catalyst.
18. A golf ball comprising:
    a core formed from a composition including (i) 10 to 45 parts per hundred of a first polybutadiene, said first polybutadiene polymerized in the presence of a cobalt or nickel-based catalyst, and said first polyimide has a Mooney viscosity of from about 70 to about 83 and a Z-average molecular weight of from out 6,000 to about 750,000, and (ii) 55 to 90 parts per hundred of a second polybutadiene, said second polybutadiene polymerized in the presence of a neodymium or lanthanide series catalyst; and
    at least one or more cover layers disposed about said core.
19. The golf ball of claim 18 wherein said second polybutadiene exhibits a Mooney viscosity of from about 35 to about 70.
20. A golf ball comprising:
    a core formed from a composition including (i) 10 to 45 parts per hundred of a first polybutadiene, said first polybutadiene polymerized in the presence of a cobalt or nickel-based catalyst, and said first polybutadiene has a Mooney viscosity of from about 70 to about 83 and a peak molecular weight of from about 150,000 to about 200,000, and (ii) 55 to 90 parts per hundred of a second polybutadiene, said second polybutadiene polymerized in the presence of a neodymium or lanthanide series catalyst; and
    at least one or more cover layers disposed about said core.
21. The golf ball of claim 20 wherein said second polybutadiene exhibits a Mooney viscosity of from about 35 to about 70.

* * * * *